Jan. 27, 1959   U. P. TRUDEAU   2,870,654
MECHANICAL POWER TRANSMISSION MECHANISM
Filed Aug. 9, 1954   3 Sheets-Sheet 1
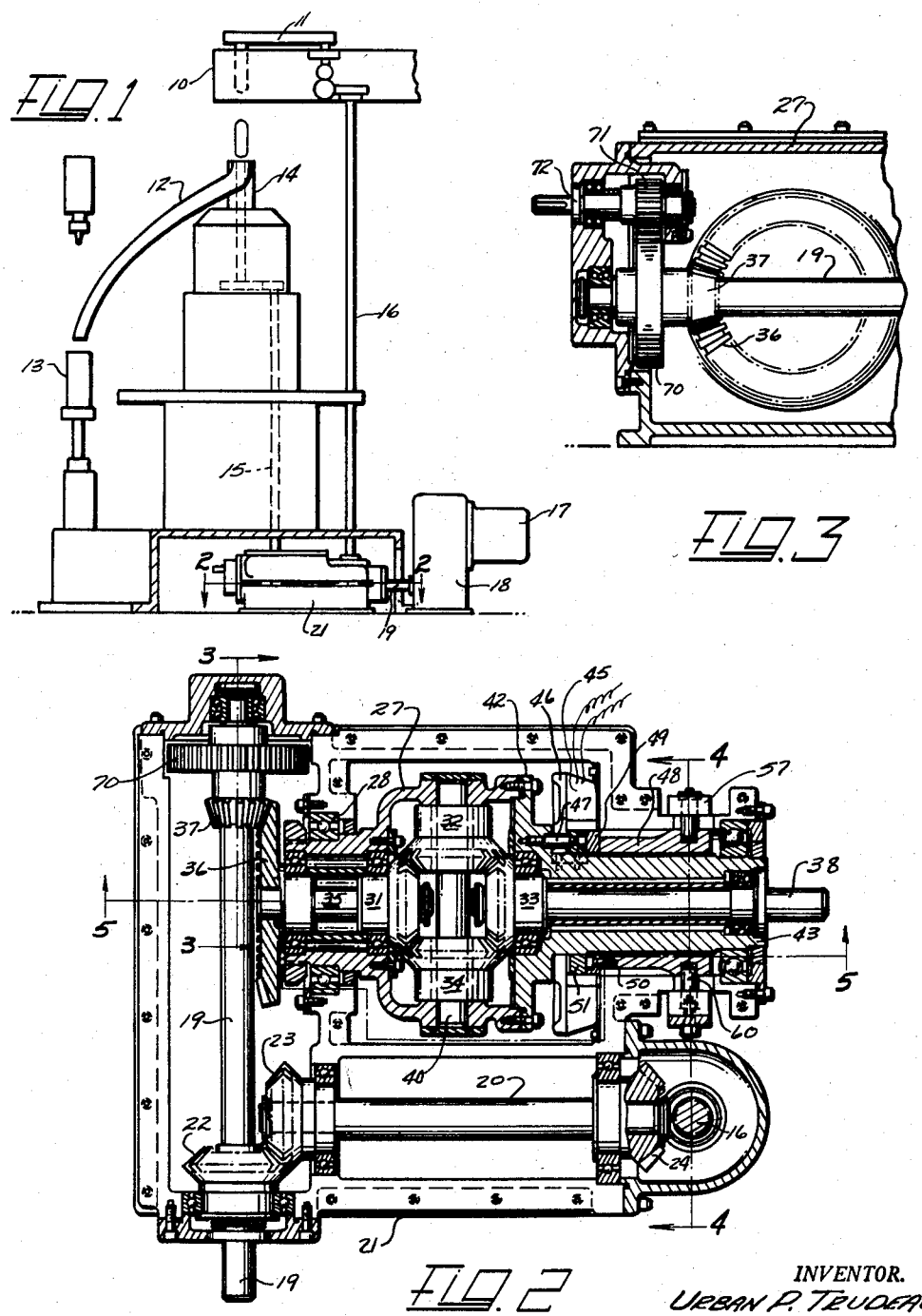
INVENTOR.
URBAN P. TRUDEAU
BY Rule and Hoge,
ATTORNEYS Jan. 27, 1959  U. P. TRUDEAU  2,870,654
MECHANICAL POWER TRANSMISSION MECHANISM
Filed Aug. 9, 1954  3 Sheets-Sheet 3

INVENTOR.
URBAN P. TRUDEAU
BY Rule and Hoge
ATTORNEYS

United States Patent Office 2,870,654
Patented Jan. 27, 1959

2,870,654

MECHANICAL POWER TRANSMISSION MECHANISM

Urban P. Trudeau, Toledo, Ohio, assignor to Owens-Illinois Glass Company, a corporation of Ohio Application August 9, 1954, Serial No. 448,472

8 Claims. (Cl. 74—777)

My invention relates to transmission mechanism through which power is transmitted from a motor driven power shaft or other power element and operates to drive a machine, machines or other load elements.

An object of the invention is to provide improved means by which a machine or load to be driven may be operatively connected to the power shaft while the latter is running, without the usual shock and strain incident to starting a heavy load, particularly where a positive driving clutch is interposed between the power shaft and the load shaft. The invention is of special utility when employed to effect a driving connection of one machine or mechanism with the same motor which is driving some other machine or mechanism and in which the machines must be in exact phase.

A further object of the invention is to provide transmission mechanism of the character indicated in which one machine comprising a periodically operated mechanism may be driven from a power motor in synchronism with another machine which is being driven from the same motor and which may be stopped and started at any time desired and in which the machines are maintained in phase while both are running.

A further object of the invention is to provide novel and practical means for adjusting the phase relation between separate mechanisms driven by the same motor.

The invention in its preferred form includes a motor driven power shaft, a load shaft connected to a machine to be driven, and intermediate gearing comprising an epicyclic gear train between the shafts. Such gearing includes an intermediate element, such as a gear casing, which when driven by the motor may rotate freely while the load shaft is at rest and which when held against rotation causes the power to be transmitted to the load shaft. A friction brake arranged to apply a braking power to said rotating intermediate element causes the latter to transmit driving force to the load shaft thereby starting and accelerating the load shaft with a corresponding deceleration of the said intermediate element. When the load shaft is brought up to speed or approximately full speed a positive stop device or lock may be operated to positively lock said intermediate element and hold it stationary so that the said load shaft is positively driven by the motor. The stop device may be in the form of a single tooth clutch so that the clutch elements are always in the same relative position while the driving connection is maintained. The invention provdes means for manually adjustng the relative rotative positions of the clutch elements thus permitting adjustment of the phase relation between different mechanisms driven from the same motor.

Other objects and advantages of the invention will appear more fully hereinafter.

Referring to the accompanying drawings:

Fig. 1 is a diagrammatic view of an apparatus to which the present invention is applied;

Fig. 2 is a sectional plan view of the transmission gearing, friction brake and stop device, the view being taken substantially at the line 2—2 on Fig. 1;

Fig. 3 is a section at the line 3—3 on Fig. 2 showing means by which the gearing may be operated by hand;

Figure 4:
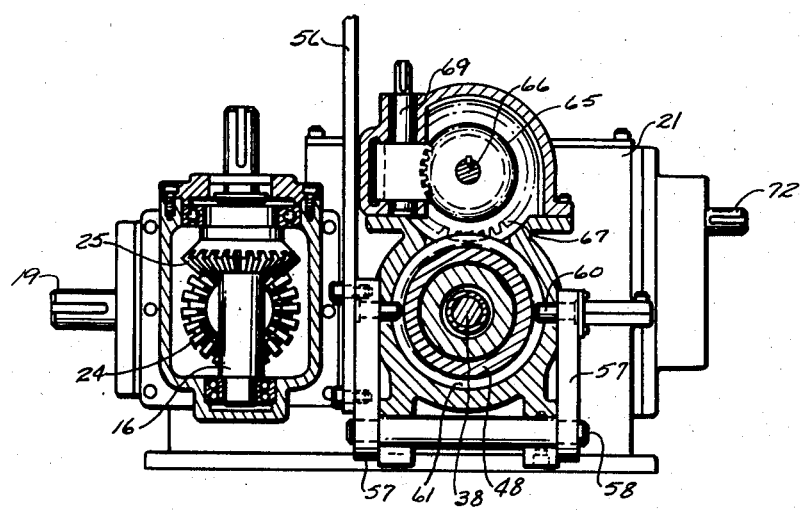
Fig. 4 is a section at the line 4—4 on Fig. 2.

Referring to Fig. 1 the invention is shown as applied to mechanism employed in the glass art, particularly for molding glass articles. This apparatus includes a feeder 10 of a type well known in the art, including a pair of shears 11 which operates periodically to sever mold charges or gobs from the glass issuing from the feeder outlet. The mold charges are dropped through a chute 12 into a series of forming molds 13. The chute is mounted on a carrier 14 which rotates about a vertical axis to bring the chute into register with the molds 13 in succession. The carrier 14 is rotated by a vertical shaft 15 operating through intermediate gearing. The shear mechanism is operated periodically in synchronism with the movement of the chute 12 by power transmitted through a vertical shaft 16. A continuously driven electric motor 17 operates through an adjustable gear transmission 18 to drive a power shaft 19 extending into a stationary housing 21 containing the transmission mechanism.

Referring to Fig. 2 the power shaft 19 is journalled in ball bearings within the casing 21. Bevel gears 22 and 23 are keyed respectively to the shaft 19 and a horizontal shaft 20 extending at right angles to the shaft 19. A bevel gear 24 keyed to the shaft 20 runs in mesh with a gear 25 (Fig. 4) keyed to the vertical feeder shaft 16. The latter is thus continually driven while the motor is running.

Within the stationary housing 21 is a rotary element in the form of a gear case 27 journalled in ball bearings 28 for free rotation about a horizontal axis perpendicular to the power shaft 19. An epicylic gear train includes bevel gears 31, 32, 33 and 34 journalled in the gear case 27. The gear 31 is keyed to shaft 35 to which is also keyed a bevel gear 36 which meshes with a pinion 37 on the power shaft 19. The gear 33 is keyed to a shaft 38, herein referred to as the load shaft or work shaft. The shaft 38 may have driving connections with the shaft 15 (Fig. 1). The gears 32 and 34 are carried on a shaft 40 mounted in the gear case 27 and extending perpendicular to the shafts 35 and 38. The case 27 includes a removable face plate 42 formed integral with a tubular extension or shaft 43 journalled for rotation within the housing 21.

Figure 6:
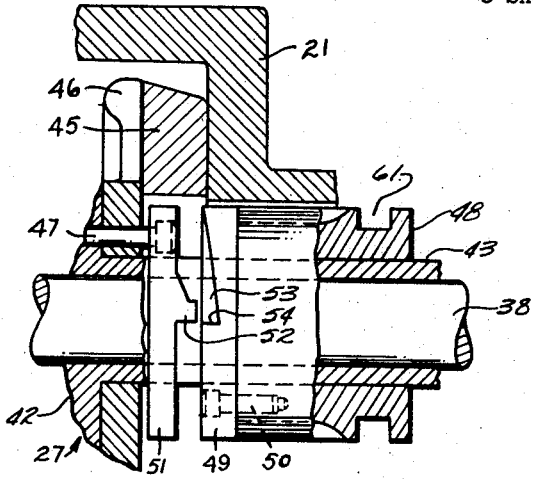
Fig. 6 is a fragmentary view on a comparatively large scale showing particularly the single tooth and its relation to the electric brake stop device.

An electric brake interposed between the gear case 27 and the housing or frame 21 includes a stationary brake element 45 attached to the frame 21 and a brake element 46 connected by a bolt 47 to the case 27 for rotation therewith. Stop mechanism for positively holding the gear case 27 locked against rotation when the brake has been applied includes a sleeve 48 surrounding the shaft 43 and movable in the direction of its length. The sleeve 48 is rotatably adjustable about its axis but is otherwise non-rotatable. The stop includes a ring 49 attached by bolt 50 to the sleeve 48, and a ring 51 connected through the bolt 47 for rotation with the gear case 27. The stop mechanism is of a single tooth type, and as shown in Fig. 6 includes a tooth 52 formed on ring 51 and adapted to enter a recess 53 in the ring 49, said recess having a stop surface 54 with which a stop surface of the tooth engages, thereby maintaining the stop members in a fixed relative position of rotation.

The stop device is manually operable by a lever 56 (Fig. 4) bolted to a rocker frame comprising arms 57 attached to a rock shaft 58. Lugs 60 on the arms 57 extend into an annular recess 61 formed on the sleeve 48.

The operation of the transmission mechanism as thus far described in detail is as follows:

Assuming the motor 17 to be running at a constant speed and a machine or load connected to the load shaft 38, the motion is transmitted to the case 27 which rotates freely about its axis while the shaft 38 is held stationary by the load. The motion transmitted to the case 27 is through the gears 37, 36, shaft 35 and the bevel gear 31. The latter rotates the gears 32 and 34, causing them to rotate about their axis and at the same time run on the gear 33 held stationary by the load shaft 38. When it is desired to start the load shaft 38 for driving the machine, the electric brake is operated, thereby applying a braking or retarding force through the brake element 46 to the case 27. This in turn causes the gears 32, 34 to apply a turning torque to the gear 33 so that the driving force tends to rotate the gear 33 and work shaft 38. The latter is thereby started and its speed gradually increased while the speed of the case 27 is reduced at a corresponding rate. In this manner the work shaft 38 is accelerated until the case 27 has been brought nearly to a stop. The lever 56 is then operated to engage the stop elements 49 and 51 and thereby positively lock the gear case 27 against further rotation so that the shaft 38 is driven positively at full normal speed. The machine connected to the load shaft 38 is now running in synchronism with the feeder shaft 16 and feeder mechanism operated thereby.

Figure 5:
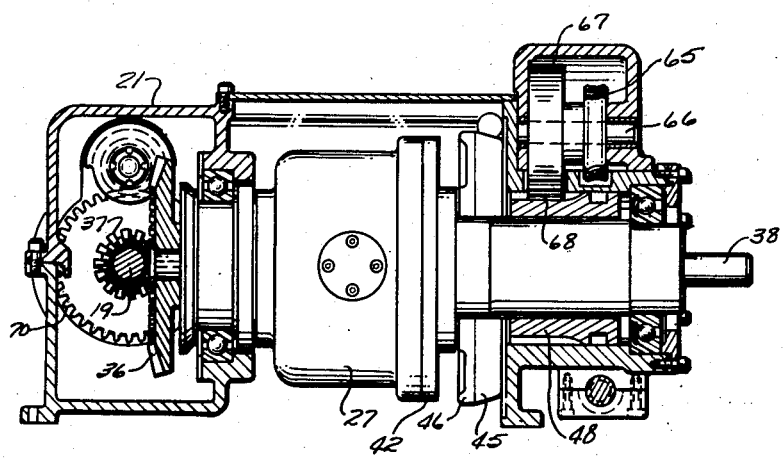
Fig. 5 is a section at the irregular line 5—5 on Fig. 2.

The sleeve 48 is rotatively adjustable for adjusting the phase relation of the feeder shaft 16 and the load shaft 38. The adjusting means for this purpose, as shown in Figs. 4 and 5, includes a worm wheel 65 keyed to a worm shaft 66. A gear 67 also keyed to the shaft 66, meshes with gear teeth 68 formed on the sleeve 48. A worm on a worm shaft 69 runs in mesh with the worm wheel 65. A hand crank may be attached to the shaft 69 for rotating it and through the gearing just described rotating the sleeve 48 to any desired position of adjustment.

The transmission gearing may be rotated by hand while the motor is deenergized or disconnected therefrom, through the gearing shown in Fig. 3. This includes a gear wheel 70 attached to the hub of the gear 37 and running in mesh with a pinion 71 keyed to a stud shaft 72 journalled in the case 27. The shaft 72 is adapted to receive a hand crank or wheel operable through the gears 71, 70 to rotate the power shaft 19.

Figure 7:
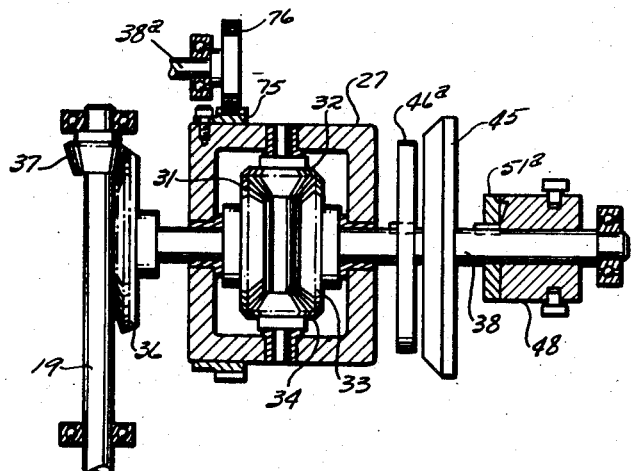
Fig. 7 is a partly diagrammatic view showing a modification of the transmission mechanism.

Fig. 7 illustrates a modification wherein the gear case 27 is geared to the load shaft 38ª. The driving connections include a ring gear 75 that meshes with a gear 76 on the shaft 38ª. The brake element 45 is attached to the machine frame as in Fig. 2. The brake element 46ª is connected to rotate with the shaft 38. The ring 51ª is keyed to the shaft 38. The sleeve 48 is slidable lengthwise of the shaft 38 and may be also rotatively adjusted on the shaft as heretofore described but is otherwise non-rotatable.

The operation of the modified construction shown in Fig. 7 is similar to that of the transmission shown in Fig. 2 except that the load is driven by the rotation of the gear case 27 while the shaft 38 is locked against rotation by the stop sleeve 48. Before starting the load, assuming the motor to be running and the brake and stop device open, the load on the shaft 38ª holds the gear case 27 stationary while the motion is transmitted to the shaft 38. If now the electric brake (comprising the brake elements 45, 46ª) is energized a retarding force is applied through the shaft 38 tending to stop the gear 33 so that a driving torque is applied to the casing 27 and to the load shaft 38ª, thereby starting the load. The load is thus started and accelerated with a corresponding slowing down of the shaft 38 and when the latter is sufficiently slowed down the stop sleeve 48 is operated to positively lock the shaft against further rotation. The machine is thus started without shock or strain on any of the mechanism.

Modifications may be resorted to within the spirit and scope of my invention.

I claim:

1. The combination of a power shaft, a load shaft mounted for rotation about its axis, power transmission gearing interposed between said shafts, said gearing including an intermediate element mounted for rotation about said axis and freely rotatable continuously by power transmitted from the power shaft while the load shaft is held against rotation by a load thereon, a friction brake comprising a friction member having a fixed connection with said intermediate element for rotation therewith and a non-rotatable friction member, said brake operable to apply a retarding force directly to the said intermediate element, said gearing including means for transmitting a driving force from the power shaft to the load shaft proportional to the said retarding force and thereby starting and accelerating the load shaft while the said rotating element is decelerated by said brake, and a stop device having a rotatable part connected to rotate with said intermediate element and a non-rotatable part mounted for movement into and out of the path of said rotatable part, said parts having interlocking surfaces brought into locking engagement when the said intermediate element reaches a predetermined position of rotation while the said non-rotatable part is in the path of said rotatable part and thereby arresting and holding said intermediate element in said predetermined position of rotation.

2. The combination of a power shaft, a load shaft, a gear train interposed between said shafts, a gear case mounted for rotation about the axis of the load shaft, said case having journalled therein gears included in said gear train and through which motion is transmitted from the power shaft to the load shaft, said gear case being freely rotatable continuously by power transmitted from the power shaft while the load shaft is held stationary by a load thereon, a brake comprising cooperating friction brake elements, one of said brake elements being connected to the said gear case for rotation therewith and means for holding the other brake element stationary while said brake elements are in contact, the brake being operable to apply a braking force to said gear case and thereby transmit driving force directly to the load shaft, means providing a stop surface connected to rotate with the gear case, and a non-rotatable stop movable into the path of said stop surface and thereby operable to arrest the gear case when the latter reaches a predetermined rotative position and hold it in said position.

3. A power transmission mechanism comprising a power shaft, a load shaft mounted for rotation about its axis, a gear case mounted for rotation about said axis, an epicyclic gear train comprising gears mounted in said case, means forming a driving connection between the power shaft and said gear train and connecting the gear train to the load shaft, a friction brake comprising a brake element having a fixed connection with the gear case for rotation therewith and a non-rotatable element, and a stop device operable to lock said gear case against rotation, said stop device including means providing a stop surface rotatable with the gear case and a non-rotatable stop surface movable into the path of the rotatable stop surface and operable thereby to arrest and hold the gear case in a predetermined rotative position.

4. The combination of a power shaft, a load shaft mounted for rotation about an axis, an element rotatable about said axis, gearing forming driving connection from the power shaft to said element and operable to rotate the latter while the load shaft is loaded, means by which power is transmitted from the power shaft to the load shaft while said element is held against rotation, a friction brake comprising cooperating friction contact members one of which is attached to said rotatable element for rotation therewith and means for holding the other contact member stationary while said members are in frictional engagement, the friction brake being operable to apply a retarding force to said rotatable element and thereby causing the driving force to be transferred to the load shaft for starting and accelerating the load shaft, and a stop device having a stop surface movable into the path of a stop surface rotatable with the said rotary element and thereby operable when the latter reaches a predetermined position to lock said rotary element against rotation.

5. The combination of a power shaft, a load shaft mounted for rotation about its axis, a gear case, a frame in which the gear case is mounted for rotation about said axis, gears journalled in said gear case for rotation about said axis, means forming a driving connection between one said gear and the power shaft and between the other said gear and the load shaft, an intermediate gear journalled for rotation about an axis perpendicular to the axis of the load shaft and running in mesh with said first mentioned gears, said gear case being free for rotation about the axis of the load shaft while the load shaft is held stationary by a load thereon, a brake interposed between said frame and said gear case, said brake comprising a rotatable brake element attached to the gear case for rotation therewith and a stationary brake element, a stationary frame in which the stationary brake element is mounted for movement into and out of engagement with the rotatable brake element, the brake being operable to apply a braking force to the said case and thereby causes transmission of the driving power to the load shaft, the load shaft being rotatable uninterruptedly by the power transmitted thereto while the said brake elements are in engagement and the gear case held stationary thereby, and stop mechanism operable to arrest and lock the gear case against rotation when it reaches a predetermined rotative position, said stop mechanism including an element connected for rotation with said gear case and a non-rotatable element, said stop being a single tooth stop by which the stop elements are held in a predetermined relative position when the stop mechanism is operated.

6. The combination of a driving element, drivable elements, power transmission gearing interconnecting said elements and operable to transmit motion from the driving element to either of said drivable elements and drive it uninterruptedly at a predetermined constant speed while the other drivable element is at rest, and means for applying a retarding force to one of the drivable elements while it is running and thereby decelerating it and concomitantly driving and accelerating the other drivable element, and means for locking one of the drivable elements in a fixed predetermined position when the other drivable element is brought up to said predetermined speed.

7. The combination of a power shaft, a load shaft, a gear train interposed between said shafts, a gear case mounted for rotation about the axis of the load shaft, said case having journalled therein gears included in said gear train and through which motion is transmitted from the power shaft to the load shaft, said gear case being mounted for free rotation continuously through a succession of complete rotations by power transmitted from the power shaft while the load shaft is held stationary by a load thereon, a brake comprising brake elements relatively movable into and out of braking engagement, one brake element being attached to the said gear case, a stationary support in which the other brake element is held stationary while the brake elements are in engagement, the brake being operable to apply a braking force to said gear case and thereby cause driving force to be transmitted to the load shaft, the load shaft being rotatable continuously by the power transmitted through said gear train while the gear case is held stationary by said brake, a stop device comprising a stop member connected to the gear case for rotation therewith and a non-rotatable stop member, a stop operating sleeve mounted for movement lengthwise of the load shaft and to which said non-rotatable stop member is connected, one of said stop members having a locking tooth with a stop surface and the other a cooperating stop surface, the stop surfaces being brought one into the path of the other by relative movement of the two stop members, and means for shifting said sleeve into an operative position for causing the arrest of the gear case at a predetermined rotative position at which the said stop surfaces are brought together.

8. The apparatus defined in claim 5 and in combination therewith an article distributing machine connected to the load shaft and driven thereby, and an article delivering machine driven from said power shaft and comprising mechanism operated periodically in synchronism with the operation of the article distributing machine for delivering articles in succession to said article distributing machine.

References Cited in the file of this patent

UNITED STATES PATENTS

| | | |
|---|---|---|
| 864,903 | Morse | Sept. 3, 1907 |
| 962,141 | Hartmann | June 21, 1910 |
| 1,476,458 | Murray | Dec. 4, 1923 |
| 1,685,166 | La France | Sept. 25, 1928 |
| 1,839,096 | Haalmeijer | Dec. 29, 1931 |
| 2,037,034 | Loughridge | Apr. 14, 1936 |
| 2,180,677 | Haller | Nov. 21, 1939 |
| 2,326,935 | Ferguson | Aug. 17, 1943 |